United States Patent [19]

Stolov

[11] 4,294,524
[45] Oct. 13, 1981

[54] IMAGE OR PICTURE PROJECTING SYSTEM USING ELECTRONICALLY CONTROLLED SLIDES

[76] Inventor: Michael Stolov, 25 Hapoel St., Nof-Yam, Herzlia, Israel

[21] Appl. No.: 150,520

[22] Filed: May 16, 1980

Related U.S. Application Data

[62] Division of Ser. No. 943,982, Sep. 20, 1978, Pat. No. 4,222,641.

[30] Foreign Application Priority Data

Jun. 29, 1978 [IL] Israel ............................. 55032

[51] Int. Cl.³ .................. G03B 21/00; G03B 21/14; H04N 9/31
[52] U.S. Cl. ............................. 353/84; 350/333; 350/339 F; 353/120; 353/122; 358/59; 358/60
[58] Field of Search ............... 353/122, 120, 31, 84; 350/330 R, 331, 333, 317, 316, 339 F; 358/59, 60

[56] References Cited

U.S. PATENT DOCUMENTS

| | | | |
|---|---|---|---|
| 3,844,650 | 10/1974 | Nicholson et al. | 353/122 |
| 4,126,382 | 11/1978 | Batzilai et al. | 350/333 |
| 4,222,641 | 9/1980 | Stolov | 353/88 |

*Primary Examiner*—Steven L. Stephan
*Attorney, Agent, or Firm*—Browdy and Neimark

[57] ABSTRACT

A large system includes a flat cinema screen on which is projected pictures from a small transparent liquid crystal display (LCD) pattern panel. A light source is provided behind the pattern panel and a cinema lens is provided in front of the pattern panel. An electronically controlled color filter in one embodiment is placed behind the pattern panel allowing one to obtain colored figures. In one variant, an electronically controlled gray filter, placed behind the pattern panel allows one to obtain artistic or black-and-white photograph-like pictures. The pattern panel together with the electronically controlled color filter and/or the electronically controlled gray filter forms an electronically controlled slide, a new electronic component.

17 Claims, 9 Drawing Figures

U.S. Patent  Oct. 13, 1981  4,294,524
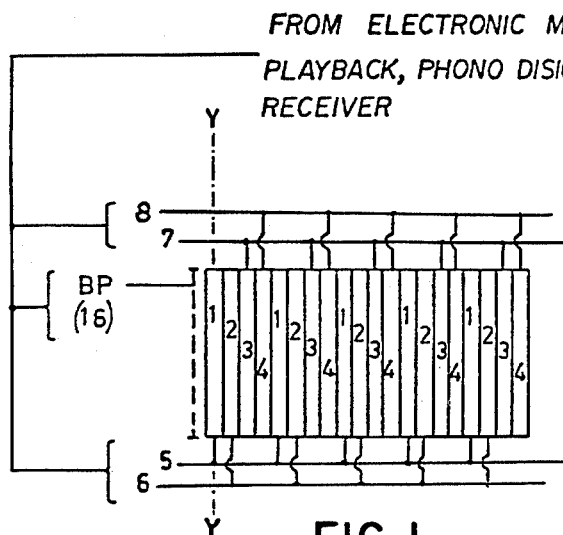
FIG. 1
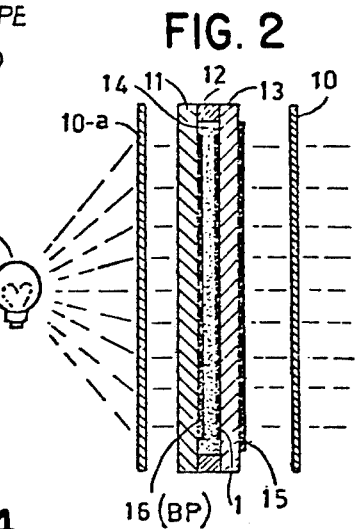
FIG. 2
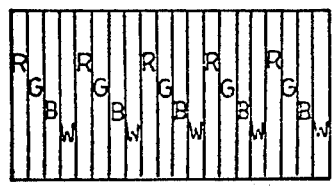
FIG. 3
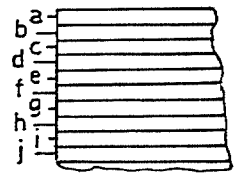
FIG. 4
FIG. 5
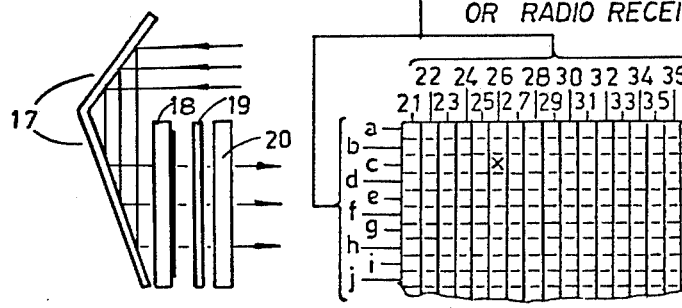
FIG. 6
FIG. 7
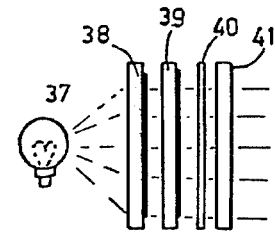
FIG. 8
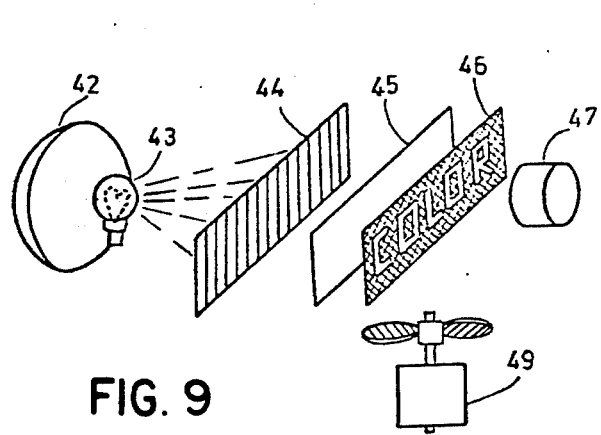
FIG. 9
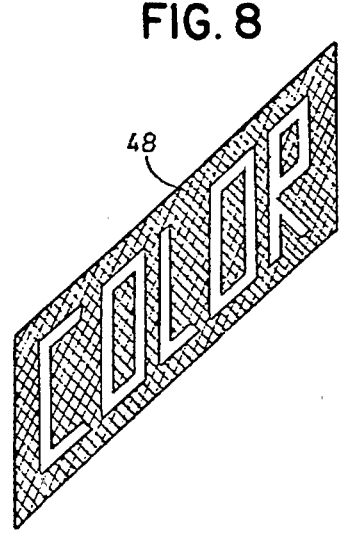

IMAGE OR PICTURE PROJECTING SYSTEM USING ELECTRONICALLY CONTROLLED SLIDES

This is a division of application Ser. No. 943,982 filed Sept. 20, 1978 now U.S. Pat. No. 4,222,641.

BACKGROUND OF THE INVENTION

This invention relates to a picture or image projection system providing a large, bright projection of pictures by electronic techniques with very small energy consumption by the electronic circuitry. More particularly, the present invention provides such a system which projects changing and/or moving images or pictures.

SUMMARY OF THE INVENTION

The present invention provides a possibility of obtaining very large and bright moving pictures, in black-and-white or color, using very simple and inexpensive techniques. The invention can be applied in advertisement systems, also as a background in theaters, in cinema or T.V. studios, also as data screens in computers instead of the conventional cathode ray tubes. In accordance with the present invention an electronically controlled filter can be used to effect multicolor digital displays in conventional devices, with very small consumption of energy.

BRIEF DESCRIPTION OF THE DRAWINGS

FIG. 1 is a front somewhat diagrammatic view of a first type of electronically controlled filter, using a liquid crystal which may form part of an image or picture projection system according to the present invention.

FIG. 2 is a detailed sectional view of the filter of FIG. 1, the section along line Y—Y in FIG. 1, in a larger scale.

FIG. 3 is a colored mask of the controllable liquid crystal display color filter, which can be used in the system of the present invention.

FIG. 4 is a view of the counter-electrodes of a second type of liquid crystal display color filter which can be used in the system of the present invention.

FIG. 5 is a front view of a pattern panel also of a color filter which is in radial form.

FIG. 6 illustrates a liquid crystal display together with an electronically controlled color filter, illuminated by externally reflected light, using mirrors.

FIG. 7 is a front view of an electronically controlled slide.

FIG. 8 is a side view of an arrangement, where a liquid crystal display pattern panel is assembled together with an electronically controlled color filter and electronically controlled gray filter in accordance with the present invention.

FIG. 9 shows an image or picture projecting system to project bright color figures from a small liquid crystal display onto a large flat screen according to the present invention.

DESCRIPTION OF THE PREFERRED EMBODIMENTS

The projection system, as illustrated in FIG. 9, includes a large transparent or reflective screen 48, a lens 47, a liquid crystal display pattern panel 46, a frosted glass or translucent plastic member 45, or a suitable lens, an electronically controlled color filter 44, a bright light source 43, a reflection mirror 42 and a motor driven blower fan shown generally at numeral 49. Light from the source 43, including that reflected by the mirror passes through the electronically controlled color filter 44, which can have its color changed, as desired. A particularly suitable example of the color filter 44 is to be considered in detail herein below. The light, which has been in effect colored in passing through the filter 44, passes the frosted glass or translucent plastic member 45 or a suitable lens and become diffused and substantially of uniform intensity. The uniform light illuminates the transparent liquid crystal display pattern panel 46. The lens 47 magnifies and projects the image or picture from the pattern panel 46 onto the large screen 48. The blower fan 49 is effective to maintain the correct temperature of the liquid crystal display panel 46 and the color filter 44. The panel 46 can comprise, for example, a conventional alpha-numeric or seven segment type of liquid crystal display. Such types can be used to provide data information on middle size screens for computers and the like, instead of the conventional complicated systems which use cathode ray tubes. Other possible uses include advertisement systems which include very large screens. Either pictures, moving or stationary, or fixed or changing data can be projected. For magnified graphic pictures in the place the liquid crystal display panel 46 of FIG. 9, a small flat panel screen based on m x n matrix of two liquid crystal displays can be used. In this case, "m" is the number of horizontal narrow strips-segments on one liquid crystal display panel, where "n" is the quantity of vertical narrow strips on the other panel, the two panels being overlaid. FIG. 7 illustrates another example of a pattern panel using a liquid crystal display. The front glass of the liquid crystal display of FIG. 7 carries electrodes in the form of vertical narrow strips, with the leads 21–36 being shown, while the rear glass carries counter-electrodes in the form of narrow horizontal strips with the leads a–j being shown. In practice, of course a considerable greater number of electrodes would be used depending on the resolution desired in any given case. Normally, the panel is opaque. If voltage is applied between one vertical front segment, for example to lead 26 and one horizontal counter-electrode, for example lead c, one point on the panel marked in FIG. 7 with an x will become transparent and the light from the light source 43, will pass through at the point x, but not at any other point. By electronically addressing a desirable group of different points, a user may create possible graphical images and pictures. The pattern panel shown in FIG. 7, when applied in the magnifying system of FIG. 9 provides a new component, which can be referred to as an electronically controlled slide (ECS).

In FIG. 5 is illustrated another embodiment of an electronically controlled slide of the present invention. Here the pattern panel is made in a radial form. The front electrodes are narrow sectors, while the counter-electrodes are narrow parallel rings, or vice versa. This electronically controlled radial slide (ECRS) provides an image which magnified on bright, large screen, can find many useful applications.

Another new component especially useful in the system of the present invention is an electronically controlled color filter, which together with the controlled slide allows a user to obtain colored bright graphical figures on a screen, particularly a large screen.

Two types of the new controllable filters are disclosed in the present application. The first which is very simple and can be driven by a very simple electronic circuitry, is suitable for data purposes only. The embodiment of this filter is explained in FIG. 1, FIG. 2, and FIG. 3.

As it is shown in FIG. 2, the new color filter includes two glass plates 11 and 13, held and separated from one another by a frame 12, between which is disposed a liquid crystal 14. The front plate 13, carries electrodes in the form of respective pluralities of narrow vertical strips, marked in FIG. 1, as 1, 2, 3, and 4, while the rear plate 11, carries a plurality of counter electrodes 16, also in the form of vertical narrow strips, situated opposite the front electrodes of the plate 13. The front electrodes, as shown in FIG. 1, are connected, inside or outside, in for groups. The electrodes marked 1 are connected to a lead 5, the electrodes marked as 2 are connected to a lead 6, the electrodes marked 3 are connected to a lead 7, and the electrodes marked with 4 are connected to a lead 8. All the counter electrodes 16 are connected together and to a lead marked "BP" on the glass plate 11 in contact with the liquid crystal 14. On the downstream surface of the glass plate 13 spaced from the crystal 14, as shown in FIG. 2, is disposed a striped color filter 15. A front view of the striped color filter is shown in detail in FIG. 3. It is a thin layer, composed of four groups of color strips which are transparent. The strips marked "R" are red, the strips marked "G" are green. The strips of the "B" group are blue, and the strips of the "W" group are white. The colored strips cover exactly the electrodes 1, 2, 3, 4 of the liquid crystal display of FIG. 1. Normally this panel is opaque. When a voltage is applied between the lead BP and any of the leads 5, 6, 7, or 8, one group of the strips R, G, B or W will become transparent. For example, when a voltage is applied between electrode BP and the lead 6, all of the strips marked as 2 will become transparent. In this case, light can pass only through the green strips. A field of green luminous strips will appear. The frosted glass 10 or similar element, makes the light uniform on all surfaces. From FIG. 1 and FIG. 3, it is clear, that a voltage on lead 5, will cause red light, a voltage on lead 7, will cause blue light, and a voltage on lead 8, will cause white light. It is possible to obtain 13 different colors by mixing the colors red, green and blue, together with the white saturation color. For example, red+white=pink, and so forth. In FIG. 2, a second frosted glass, or similar element 10-a is provided to obtain uniform white light before it reaches the color filter.

In FIG. 6 an example is illustrated, in which the first type of color filter 18 is used together with a conventional seven segment liquid crystal display (LCD) 20, activated by external reflected light. The external light, for example, day light, is reflected by mirrors 17, passes a controllable color filter 18, and becomes a desirable color. After passing a frosted glass 19, the light becomes uniform and illuminates the liquid crystal display 20. This arrangement can be use in devices such as panel meters, watches and the like. The second type filter can be obtained, if the colored mask of FIG. 3 covers exactly the pattern plate of FIG. 7. In this case, with electronically addressing of the vertical and horizontal electrodes 21-36 and a-j, it is possible to control the colors of all regions of the picture selectivity and independently. In this case, the resolution of the color filter will be four times poorer than the resolution of the pattern panel, but this is acceptable for color pictures. The second type of controllable color filter can be widely used, but requires considerable complexity in its associated electronic circuitry.

A further embodiment of a filter which can be used in the system of the present invention, is an electronically controlled gray filter (ECGF), which can be obtained if in FIG. 3, instead of four colored strips, four groups of gray filters with four different levels of gray are arranged. A mixing of the four groups of gray allow a user to obtain 13 levels of gray.

In FIG. 8, a device is illustrated, in which a controllable pattern plate 41, is arranged together with a frosted glass pane 40, controllable color filter 39, and a controllable gray filter 38. Numeral 37 is a light source. This arrangement allows a user to obtain artistic pictures and images in all possible colors on a bright and large screen, when operatively associated with a screen and lens, such as the screen 48 and lens 47 shown in FIG. 9. In FIG. 9, the system, as illustrated, includes between the lens 47 and a light source 43, a liquid crystal display pattern panel 46, a frosted glass panel 45 and a controllable color filter 44 positioned in the order set out. A reflector 42 is positioned behind the light source 43. The information of the artistic pictures and images can be stored in electronic memories, recorded on tapes, or phonograph plates. Such information also can be received from radio transmitters, which could also broadcast audio signals such as music. The present invention provides a visual picture art, as well as data display techniques.

It is to be understood that the foregoing description and accompanying drawing figures relate to illustrative embodiments and variants. Numerous other embodiments and variants are possible within the spirit and scope of the invention, its scope being defined by the appended claims.

What is claimed is:

1. A changeable image or picture system for producing complex, colored, images or pictures, the system comprising a light source; liquid crystal display means for displaying images or pictures spaced from said light source; at least one electronically controlled liquid crystal multiple color filter positioned between said light source and said liquid crystal display means; a light scattering means positioned between said at least one electronically controlled multiple color filter and said liquid crystal display means for diffusing light which has passed through said at least one electronically controlled multiple color filter into light of substantially uniform intensity at any given time; a plurality of electrodes operatively associated with said liquid crystal display means; means for supplying selectively to individual ones of said electrodes associated with said liquid crystal display means voltages to make selected portions or said liquid crystal display means transparent thereby selectively passing area portions of light from said means tor diffusing; a screen; and lens means for projecting the area portions of light passing through said liquid crystal display means onto said screen; whereby colored, complex images or pictures appear on the screen.

2. A changeable image or picture system according to claim 1, wherein said screen means is a large screen and said lens means is a cinema lens.

3. A changeable image or picture system according to either claim 1 or claim 2, including a motor-driven blower means for maintaining said at least one electronically controlled color filter and said liquid crystal display means at a correct temperature.

4. A changeable image or picture system according to claim 1 or claim 2, wherein said liquid crystal display means is positioned between said light scattering means and said lens means.

5. A changeable image or picture system according to claim 4, including a reflector positioned adjacent said light source to direct light therefrom toward said at least one electronically controlled color filter.

6. A changeable image or picture system according to claim 4, wherein said at least one electronically controlled color filter comprises a liquid crystal device having a number of electrodes in the form of narrow strips on at least one major surface of said crystal device and at least one colored strip.

7. A changeable image or picture system according to claim 6, wherein said light scattering means is a pane of frosted glass.

8. A changeable image or picture system according to claim 4, wherein said at least one electronically controlled color filter comprises a liquid crystal device having electrodes in the form of narrow strips on at least one major surface of said crystal device, on which is disposed a layer of colored strips of the colors red, green, blue and white.

9. A changeable image or picture system according to claim 8, wherein said light scattering means is a pane of frosted glass.

10. A changeable image or picture system according to claim 1 or claim 2, wherein said liquid crystal display means comprises an electronically controllable liquid crystal pattern panel in a radial form, based on an m by n matrix defined by m number of electrodes in the form of narrow sectors and an n number of electrodes in the form of concentric rings, the n and m electrodes being positioned on opposite surfaces of said panel.

11. A changeable image or picture system according to claim 1 or claim 2, wherein said light source comprises mirror means which reflects ambient light toward said liquid crystal display means.

12. A changeable image or picture system according to claim 1 or claim 2, wherein said means for supplying voltages comprise means for feeding data-representing voltages to said electrodes.

13. A changeable image or picture system according to claim 12, wherein said means for feeding data-representing voltages comprise electronic memory means.

14. A changeable image or picture system according to claim 12, wherein said means for feeding data-representing voltages comprises recording tape playback means.

15. A changeable image or picture system according to claim 12, wherein said means for feeding data-representing voltages comprises phonographic disc playback means.

16. A changeable image or picture system according to claim 12, wherein said means for feeding data-representing voltages comprises radio receiving means which can receive and demodulate signals from at least one radio transmitter.

17. A changeable image or picture system for producing complex, colored, images or pictures, the system comprising a light source; liquid crystal display means for displaying images or pictures spaced from said light source; at least one electronically controlled liquid crystal multiple color filter including a plurality of electrodes positioned between said light source and said liquid crystal display means; a light scattering means positioned between said at least one electronically controlled multiple color filter and said liquid crystal display means for diffusing light which has passed through said at least one electronically controlled multiple color filter into light of substantially uniform intensity at any given time; a second plurality of electrodes operatively associated with said liquid crystal display means; and means for supplying selectively to individual ones of said electrodes associated with said liquid display means voltage to make selected portions of said liquid crystal display means transparent thereby selectively passing area portions of light from said means for diffusing; whereby color, complex images or pictures can be viewed on the liquid crystal display means.

* * * * *